UNITED STATES PATENT OFFICE.

HENRY BLUMENBERG, JR., OF NEW YORK, N. Y.

BATTERY COMPOUND.

SPECIFICATION forming part of Letters Patent No. 638,041, dated November 28, 1899.

Application filed July 20, 1899. Serial No. 724,444. (No specimens.)

*To all whom it may concern:*

Be it known that I, HENRY BLUMENBERG, Jr., a citizen of the United States, residing at New York city, (Wakefield,) in the borough of Bronx, State of New York, have invented an Improvement in Battery Compounds, of which the following is a specification.

My invention relates to an improvement in compounds for battery solutions and to that class of solutions containing ammonium chlorid. This material is at the present time extensively used for open-circuit cells. With this material objections or difficulties arise, because detrimental incrustations are frequently formed of oxychlorid of zinc on both the carbon and zinc poles, thereby increasing the internal resistance and eventually making the cell practically useless. I have found that this difficulty can be prevented to a greater or less extent by adding to the ammonium chlorid a solution of the bisulfates of the metals of the alkalies or alkali-earth metals. The advantage of this improvement can be easily seen in keeping the electrodes practically free from such coating or incrustation. My invention therefore relates to the addition of a salt containing an acid, preferably sulfuric acid, the salt being any well-known bisulfate of the metals of the alkalies or alkali-earth metals, and in this improvement I bring into action the sulfuric acid contained in the bisulfate of the metals of the alkalies or alkali-earth metals.

The exact proportions do not need to be adhered to for the reason that sal-ammoniac (ammonium chlorid) in itself will for a period of time if concentrated dissolve considerable quantities of oxychlorid of zinc; but when the point is reached that it ceases to act then the materials of my improvement will act, as heretofore set forth.

In order to prolong the life of the battery compound and to prevent a too-violent action, I sometimes add aluminium tersulfate. This aluminium salt should only be added to the extent of the solubility of the ammonia alum which is formed when the aluminium tersulfate is added to the ammonium chlorid; but I do not limit myself to the use of this material.

I do not restrict myself to the sulfate of aluminium in a pure and simple condition, as I am well aware that the alums may in some cases replace it. The sulfuric-acid radical is in excess in all of the compounds and tends to keep the electrodes clear and free from incrustation.

The materials will usually be mixed dry in the proper proportion, so as to simply require the addition of water.

I claim as my invention—

1. A battery compound of ammonium chlorid and a bisulfate of the metals of the alkalies or alkali-earth metals, substantially as set forth.

2. A battery compound of ammonium chlorid and a bisulfate of the metals of the alkalies or alkali-earth metals and aluminium tersulfate, substantially as set forth.

Signed by me this 17th day of July, 1899.

HENRY BLUMENBERG, JR.

Witnesses:
GEO. T. PINCKNEY,
ELLA E. POHLÉ.